Figure 5B:
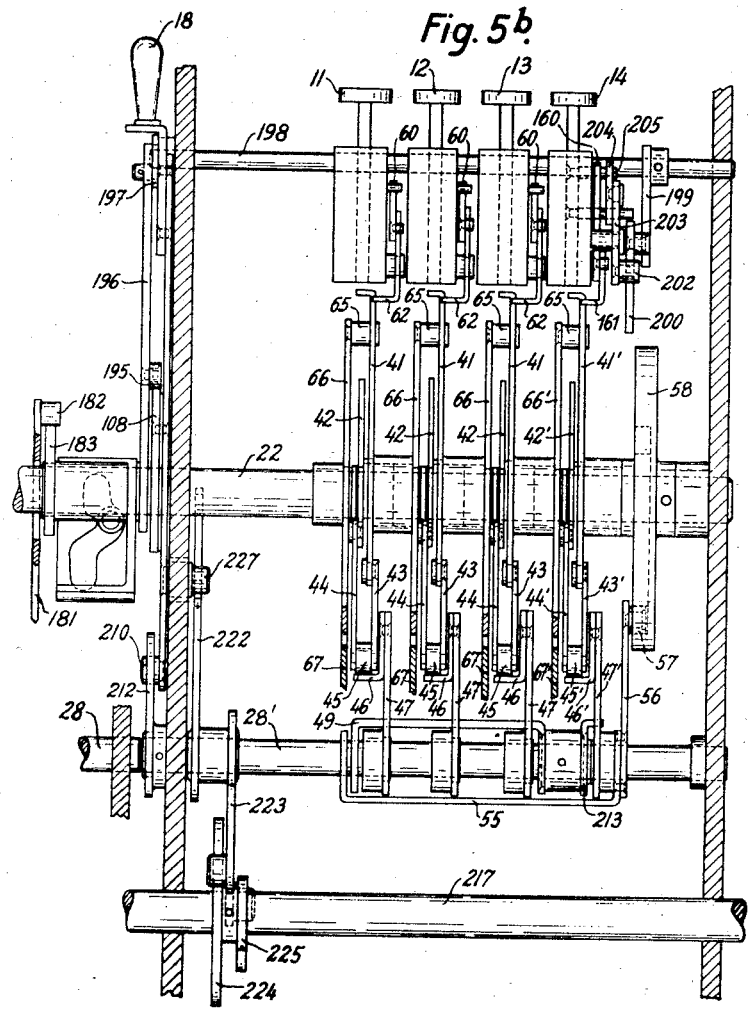

March 30, 1937.  E. BREITLING ET AL  2,075,635
CASH REGISTER, ACCOUNTING AND THE LIKE MACHINE
Filed Sept. 5, 1935   18 Sheets-Sheet 1
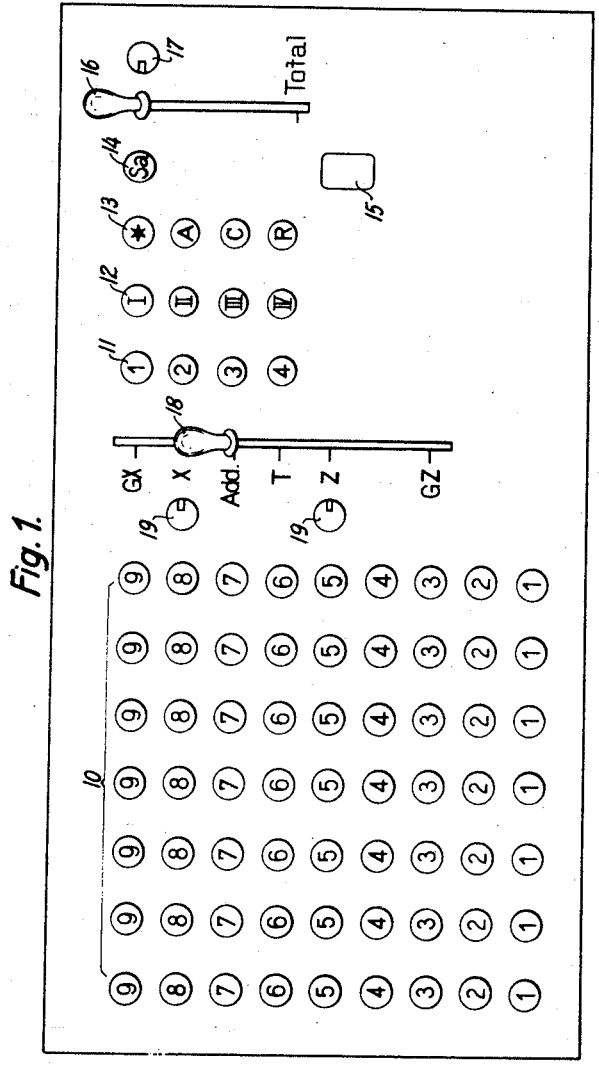
Inventors
Ernst Breitling
and Julius Patzelt
By
Yearl Benst
their Attorney

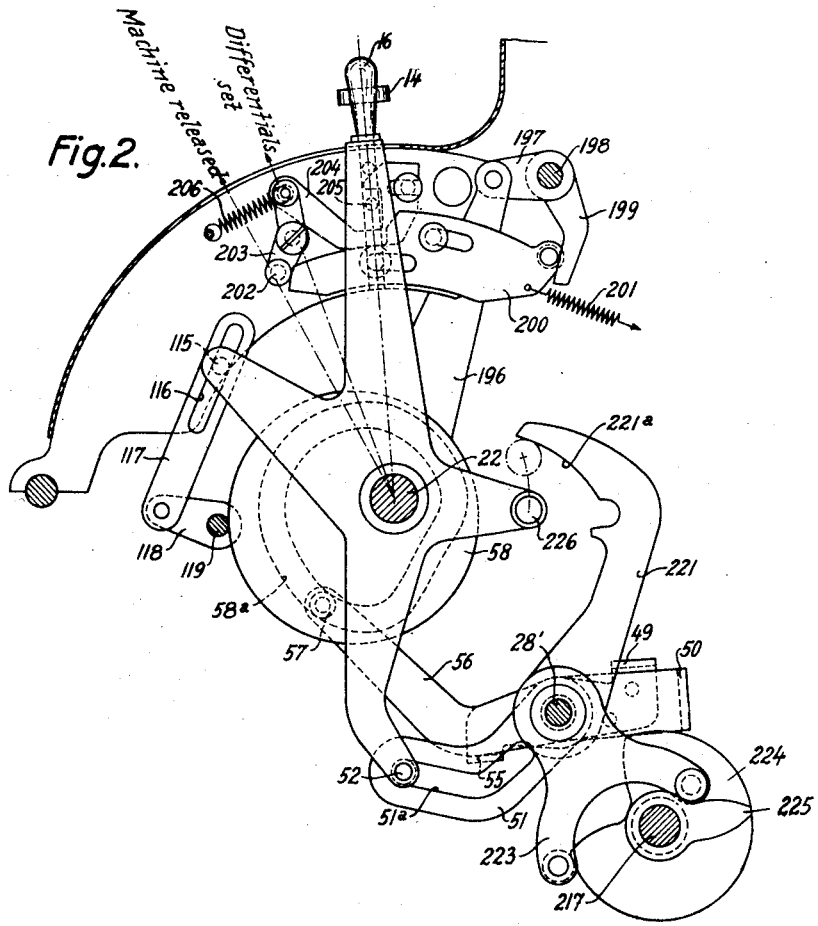

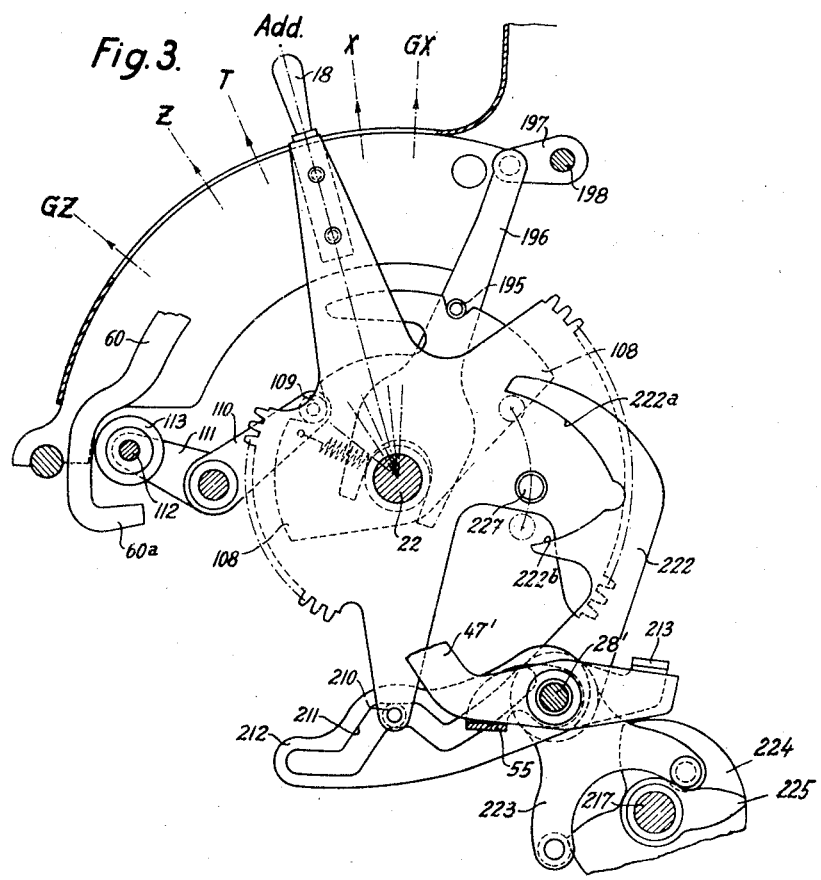

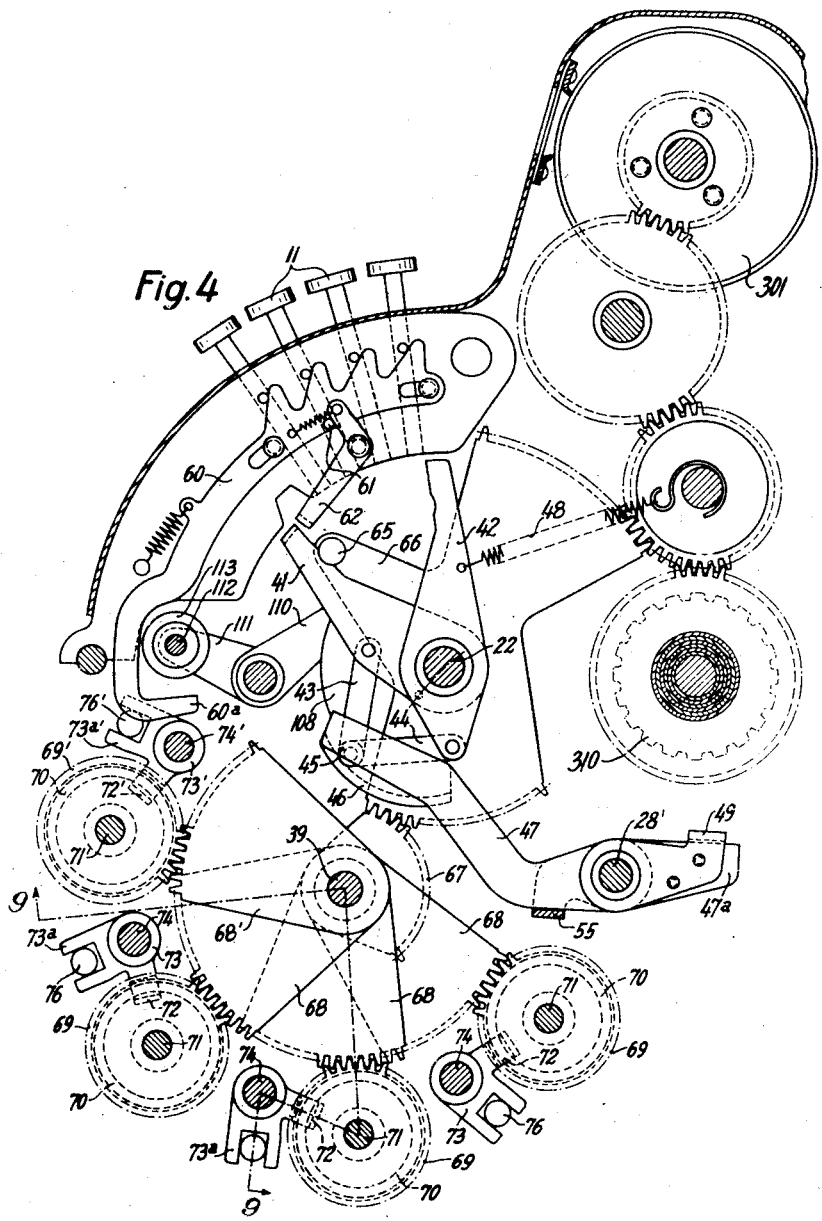

March 30, 1937.     E. BREITLING ET AL     2,075,635
CASH REGISTER, ACCOUNTING AND THE LIKE MACHINE
Filed Sept. 5, 1935     18 Sheets-Sheet 5
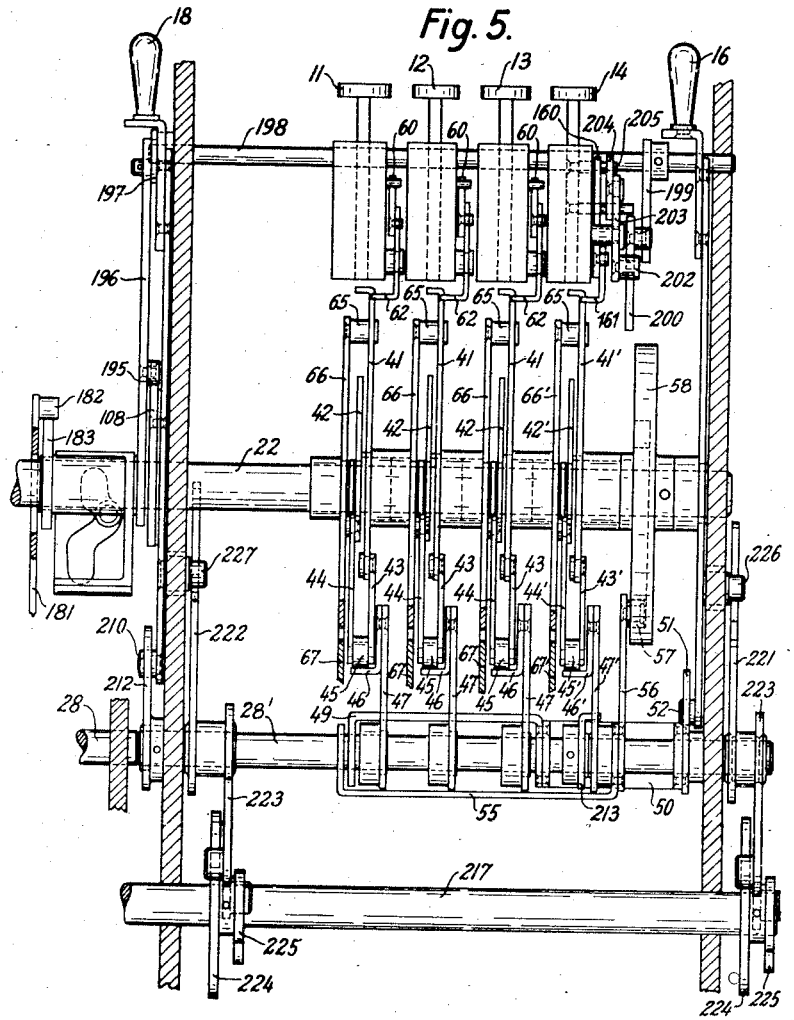
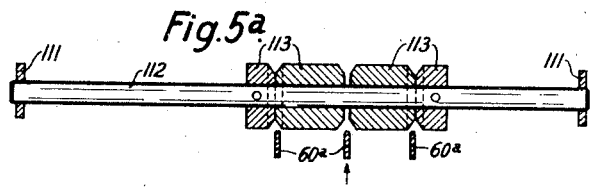
Inventors
Ernst Breitling
and Julius Patzelt
By
their Attorney

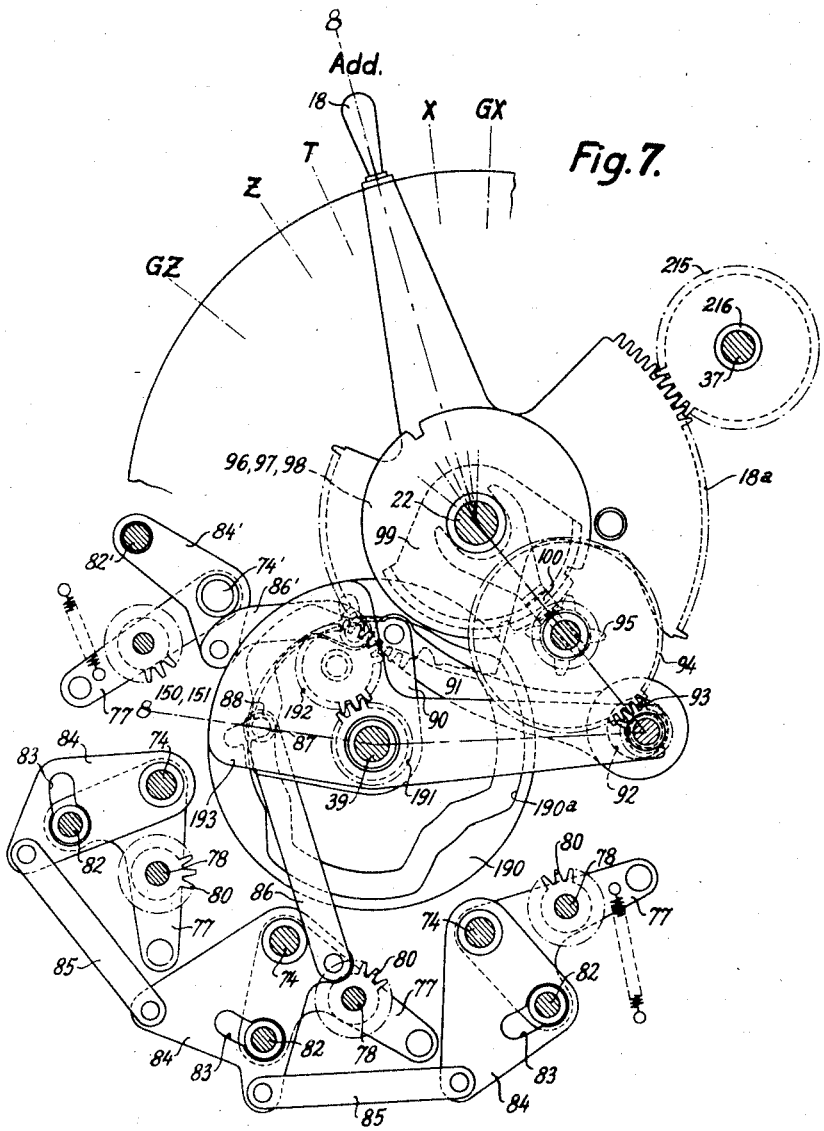

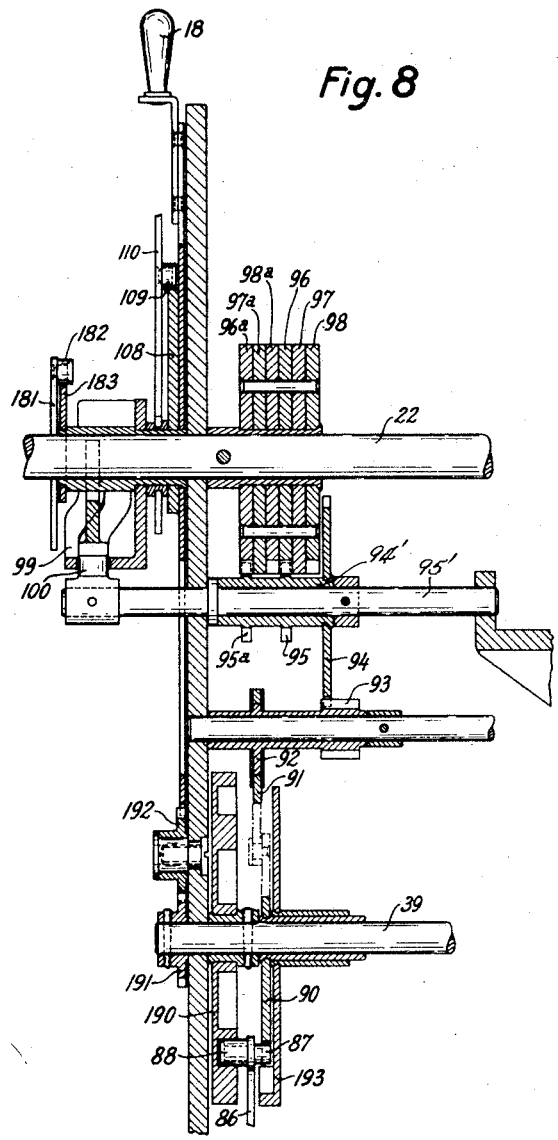

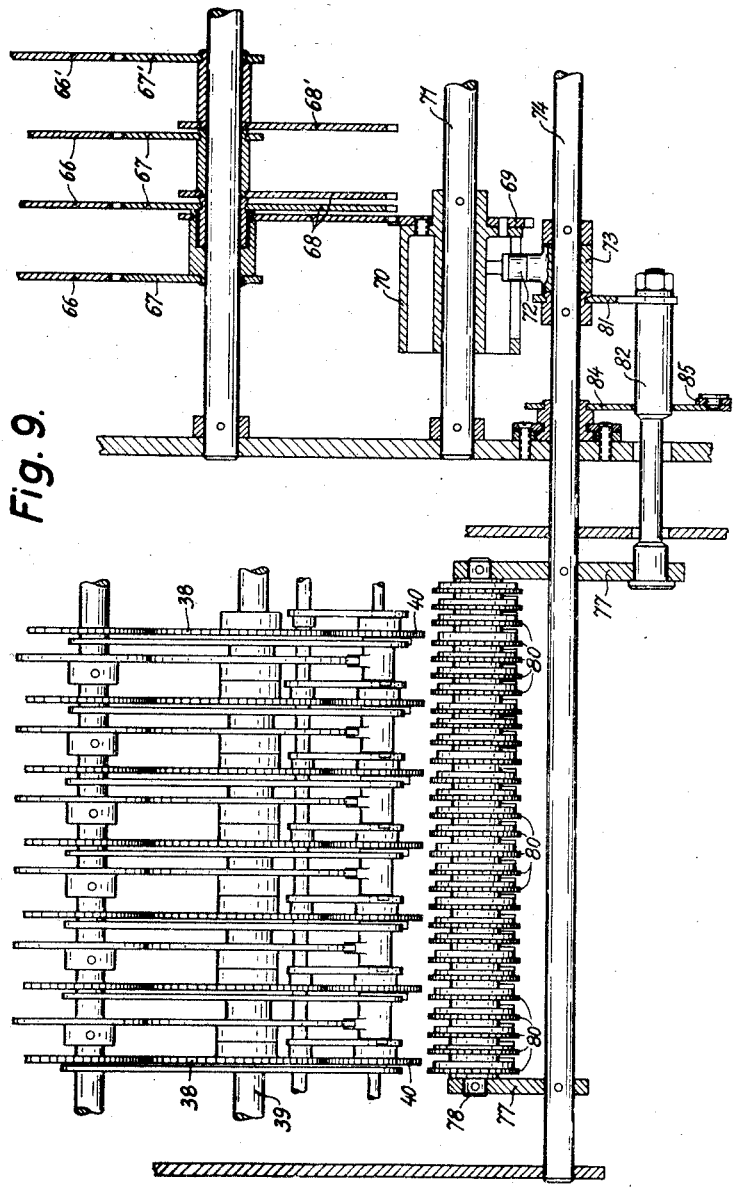

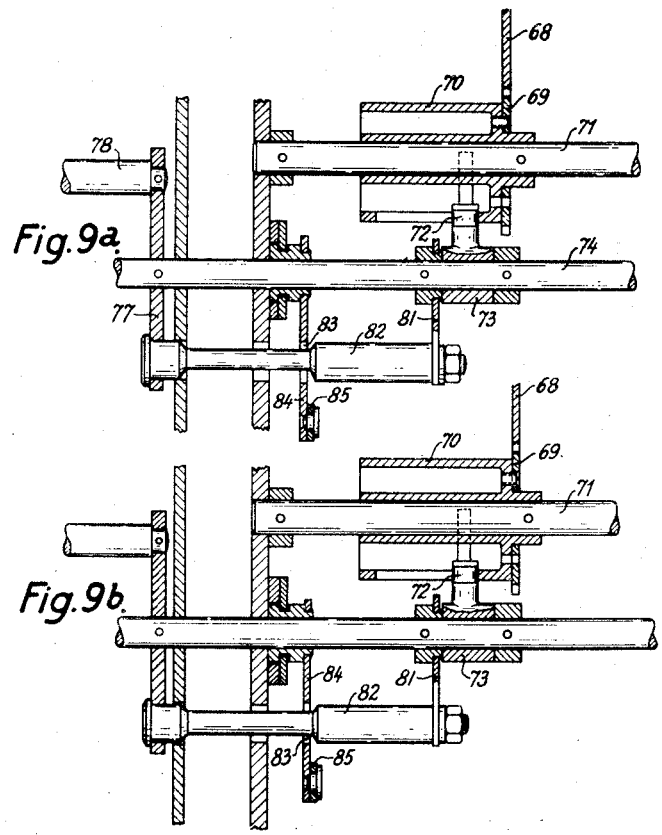

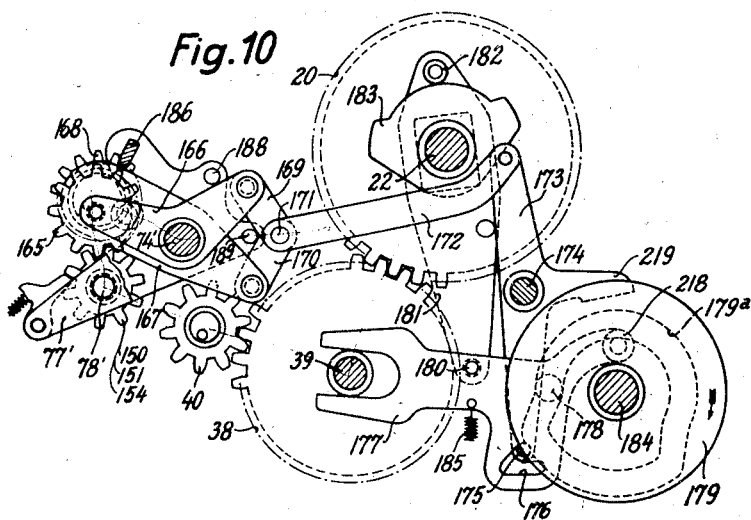
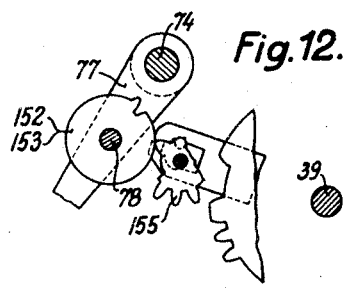

March 30, 1937.  E. BREITLING ET AL  2,075,635
CASH REGISTER, ACCOUNTING AND THE LIKE MACHINE
Filed Sept. 5, 1935  18 Sheets-Sheet 13
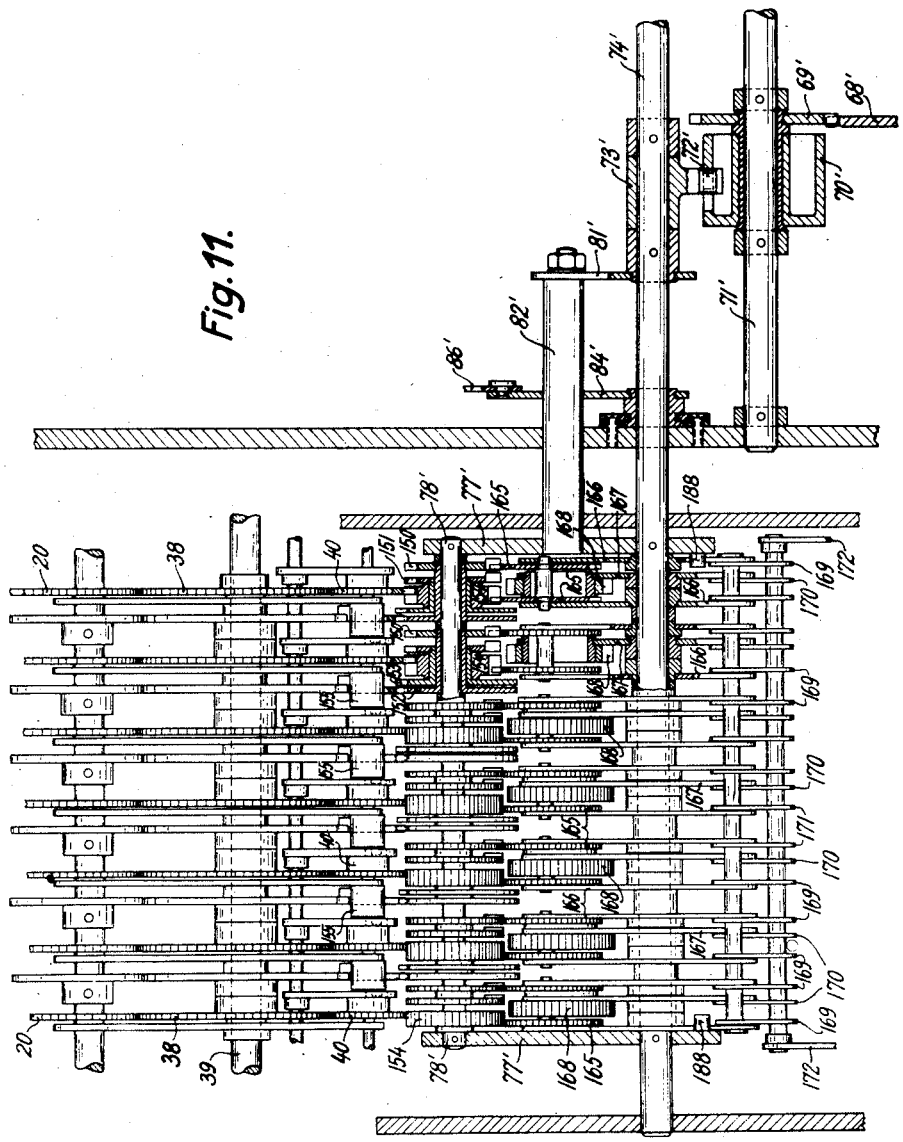
Inventors
Ernst Breitling
and Julius Patzelt
By
their Attorney March 30, 1937.  E. BREITLING ET AL  2,075,635
CASH REGISTER, ACCOUNTING AND THE LIKE MACHINE
Filed Sept. 5, 1935  18 Sheets-Sheet 14

Inventors
Ernst Breitling
and Julius Patzelt
By Carl Benst
their Attorney

March 30, 1937.  E. BREITLING ET AL  2,075,635
CASH REGISTER, ACCOUNTING AND THE LIKE MACHINE
Filed Sept. 5, 1935    18 Sheets-Sheet 15

Inventors
Ernst Breitling
and Julius Patzelt
By
Earl Beust
their Attorney

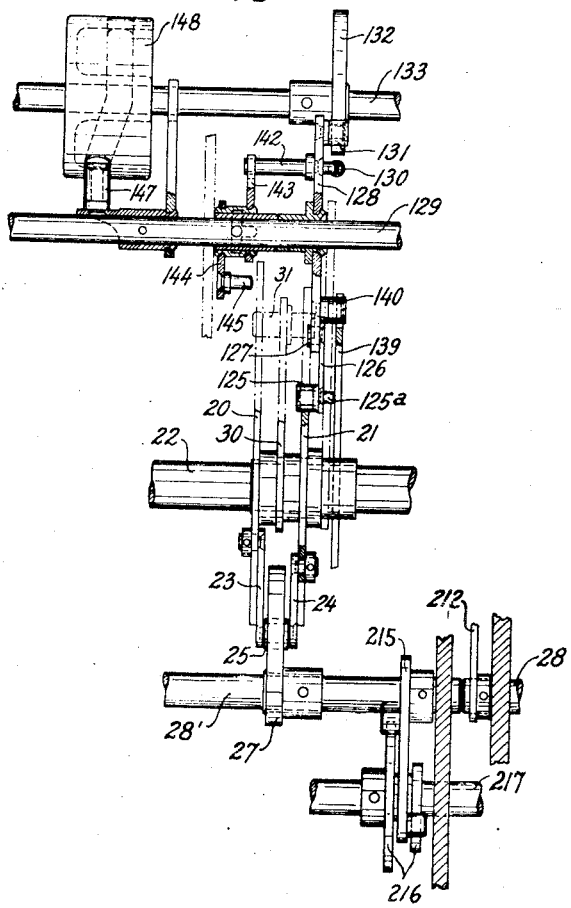

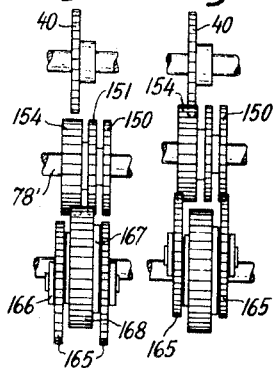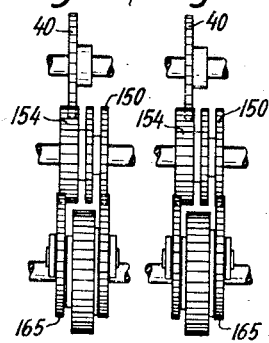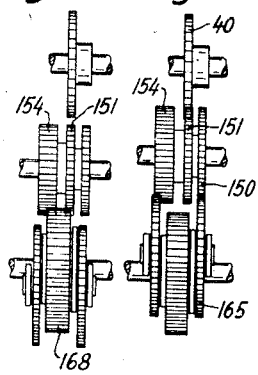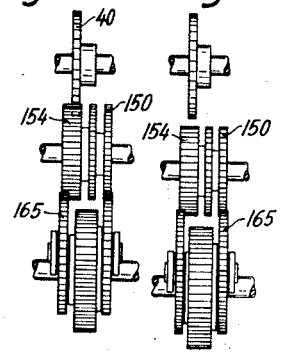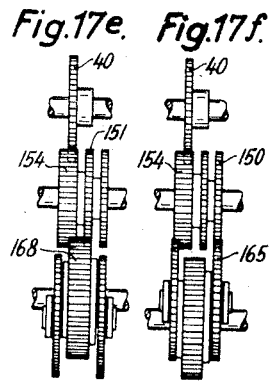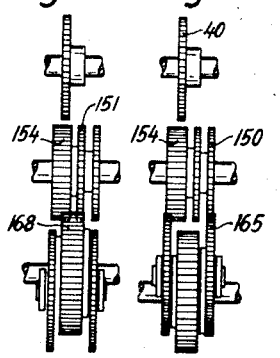

Patented Mar. 30, 1937

2,075,635

UNITED STATES PATENT OFFICE 2,075,635

CASH REGISTER, ACCOUNTING AND THE LIKE MACHINE

Ernst Breitling, Berlin-Tempelhof, and Julius Patzelt, Berlin, Germany, assignors to The National Cash Register Company, Dayton, Ohio, a corporation of Maryland Application September 5, 1935, Serial No. 39,209
In Germany November 7, 1934

6 Claims. (Cl. 235—7)

The invention relates to a cash register, accounting and the like machine and more particularly to a differential device consisting of two complementarily moved members for such machines, provided with several totalizer rows for adding and total operations and having means for recording such operations. Such a differential device is shown and described in Letters Patent of the United States, No. 2,039,143, issued to Ernst Breitling on April 28, 1936.

The main object of the invention is to warrant an equal total movement in each operation of the complementarily moved differential members, by arranging novel actuating means for said members.

Another object of the invention is to provide a minimum movement device for the registering means set by the differential device as indicating and printing means by which they are set directly from the one figure to the other without having passed zero in each operation.

Another object of the invention is to adapt the totalizer engaging means for simultaneous engagement of any one, or several, or all totalizer rows, at will.

Another object of the invention is to adapt one totalizer of any row for itemizing operations and control its engagement in addition to one or several other totalizer rows during such operations.

Another object of the invention is to arrange a main totalizer and preferably with the itemizing totalizer in the same row and to control the simultaneous engagement of the main totalizer in addition to any or several totalizer rows.

Another object of the invention is to provide disabling means for the main totalizer engaging means in multiple item total taking operations for changing the timing of such engagement.

A still further object of the invention is to provide a novel arrangement for selecting a totalizer row and any totalizer in said row.

Another object of the invention is to reduce the number of revolutions of the main shaft and do away with idle machine operations in total taking operations.

Another object is to adapt controlling means for the totalizer engaging means actuated in adding operations by the machine drive and in total taking operations by the machine operation conditioning means in cooperation with the totalizer selecting means.

Another object of the invention is to enable transfer of a total taken from a totalizer to another totalizer of the same row during a single machine operation.

Further objects of the invention will be pointed out in the following detailed description with reference to the annexed drawings.

A preferred form of an embodiment of the invention is shown in the annexed drawings.

Figure 6:
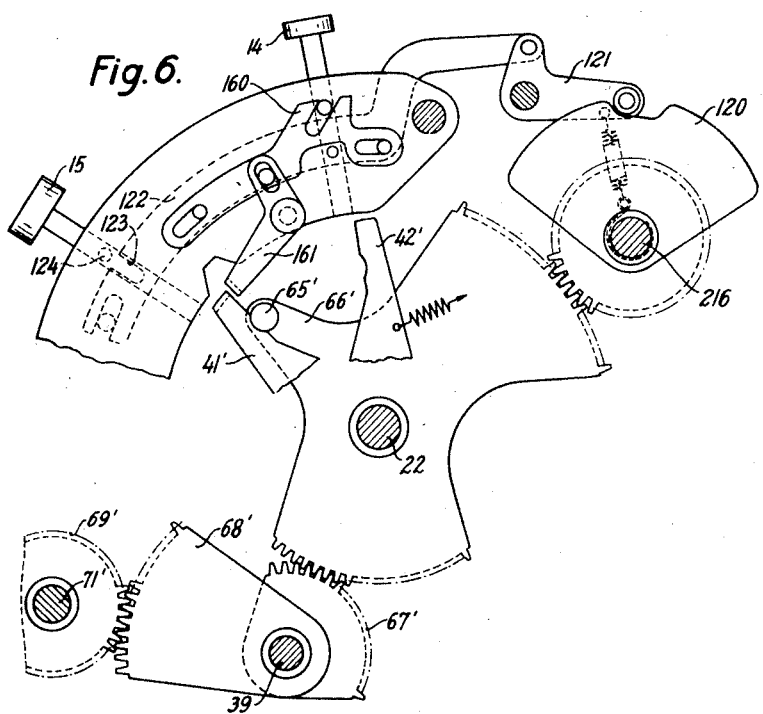
Figure 13:
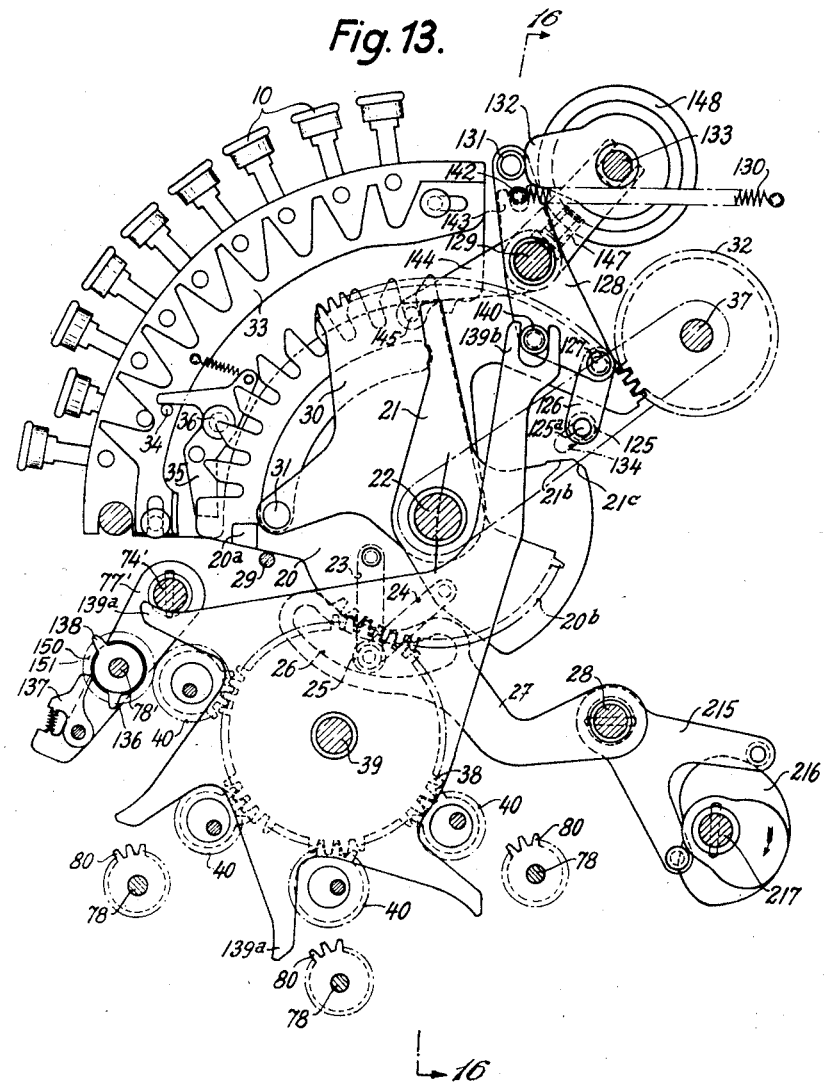
Figure 14:
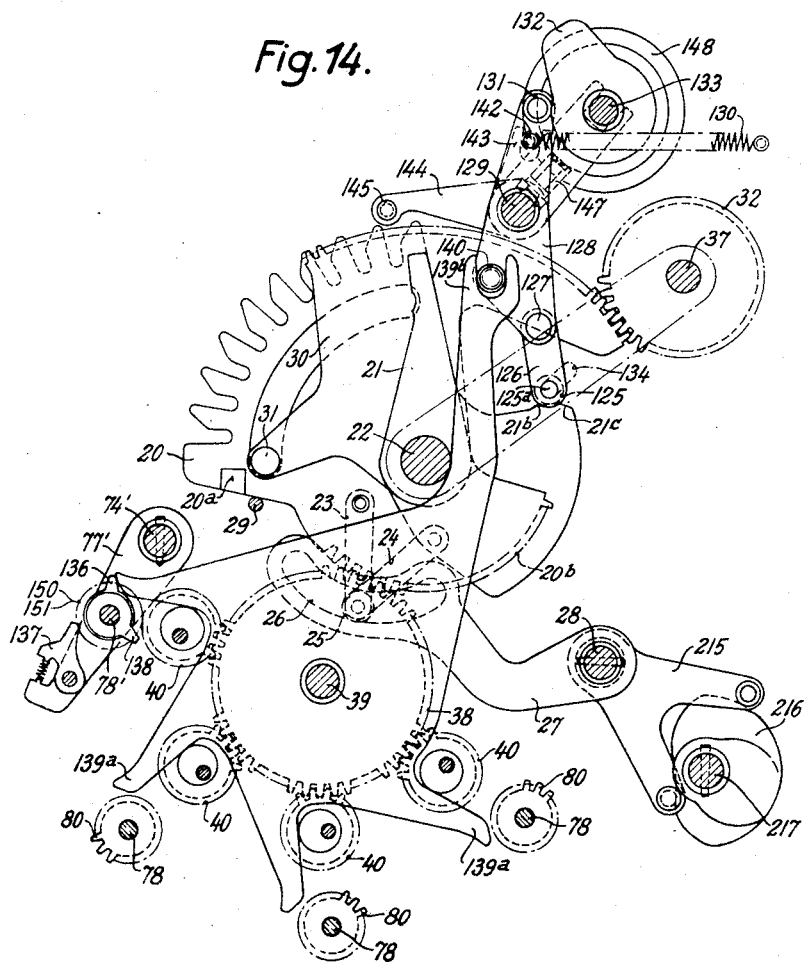
Figure 15:
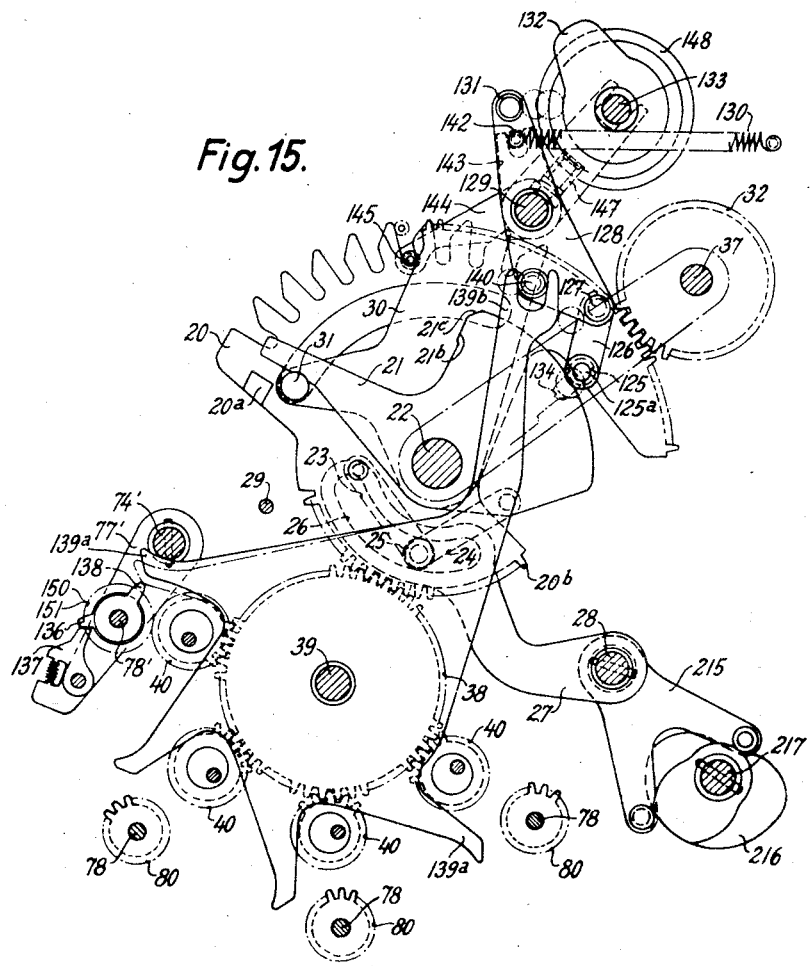

Of said drawings:

Fig. 1 shows the key board of the machine,

Fig. 2 is a side view of the total taking lever and of actuating means controlled thereby, Fig. 3 is a side view of the mode of operation lever and of actuating means controlled thereby, Figs. 4 and 5 are a side view and a front view of the totalizer selecting device, Fig. 5a is a top view of a detail shown in Fig. 4, Fig. 5b shows in top view a modified form of the totalizer selection actuating device, Fig. 6 is a side view of a special key bank containing the itemizing key and the motor key and means connected therewith, Fig. 7 is a side view of the totalizer engaging device, Fig. 8 is a section through the mode of operation control device drawn on the line 8—8 of Fig. 7, Fig. 9 is a section through the totalizer selecting and engaging device on the line 9—9 of Fig. 4, Figs. 9a and 9b are sections of the totalizer engaging device for two other rows of totalizers, Fig. 10 is a side view of the selecting and engaging device for the main totalizer and the itemizing totalizer, Fig. 11 is a front view of Fig. 10, Fig. 12 is a side view of the tens transfer device of a row of totalizers, Fig. 13 is a side view of the amount differential device in the add position, Fig. 14 shows the same at the start for total taking, and Fig. 15 during total taking, Fig. 16 is a section through the amount differential device of a denominational order drawn on the line 16—16 of Fig. 13, Figs. 17a to 17i, 17k, 17m, and to 17n show different positions of the engaging device of Figs. 10 and 11.

Key board

The key board of a machine embodying the invention by way of example, contains, in addition to several rows of amount key banks 10 (Fig. 1), three rows of totalizer selecting, or special keys 11, 12 and 13, of which the keys 11 are adapted to select clerk totalizers, the keys 12 department totalizers, and the keys 13 transaction totalizers. For adding operations one key in each one of these three banks of special keys can be depressed simultaneously. Further, a multiple item key 14 is arranged in a fourth key bank, which key has to be depressed for entering a series of multiple items. A motor key 15 of the same bank serves to release the machine for all adding and item total taking operations. For taking totals from the remaining totalizers, the machine release is effected by means of a setting lever 16 set to total taking, which in its adding position normally is locked by a lock 17. To condition the machine for the different modes of operation, a mode of operation or machine conditioning lever 18 is provided which can be set by the sales person either to adding position for entering amounts, or to the "T" position for taking a multiple item total. The remaining positions, X, Z, GX, GZ of the conditioning lever 18 provided for taking sub-totals or totals from the special totalizers and the main totalizer respectively, are, normally, locked and can be used only by the authorized persons after inserting keys in locks 19.

*Amount differential devices*

The amount differential devices of the machine (Fig. 13) consist of a main differential member 20 and an auxiliary differential member 21 in each denominational order, both of which members are rotatably arranged on a shaft 22. A link 23 is linked to the main differential member 20, and a link 24 to the auxiliary differential member 21. The free ends of the two links 23 and 24 are hinged together by a stud which carries a roller 25 guided in a curved groove 26 of an actuating arm 27. The actuating arms 27 of all denominational orders are mounted upon a shaft 28, which shaft at each machine operation is rocked through a certain angle, first clockwise, and then counter-clockwise. This is effected by a double-armed lever 215, which is mounted upon the shaft 28 and provided with rollers on its ends actuated by a double cam disk 216 of a drive shaft 217 performing during a machine operation a revolution in clockwise direction. In consequence of the clockwise rocking movement of the arm 27 the differential members 20 and 21 are moved one against the other and closed like the tongues of scissors or pliers. When the one of the two differential members engages the foot of an amount key 10 at the time depressed and is thus arrested, the other differential member actuated by the arm 27 continues its movement till it contacts from the other side the foot of the respective amount key. Corresponding to the value of the key depressed, the two differential members 20 and 21 are rocked different degrees. The roller 25 will occupy, according to the key just depressed, different positions in the curved groove 26 of the actuating arm 27. The total of the respective movements of the two differential members 20 and 21, however, is the same each time. In order to secure the equal total movement in all operations, at the end of the clockwise movement of the arm 27 the curved groove 26 is positioned concentrically to the shaft 22 (see Fig. 15). Upon the return movement, which takes place after an interruption of a certain duration of the actuating arm 27, the members 20, 21 are moved apart, and they are arrested in the zero position by a rigid stop 29 (Fig. 13). A setting member 30 is rotatably arranged on the shaft 22, a pin 31 of which projects into the path of the differential members 20 and 21 and is gripped by them in a scissors-like manner, and thereby it is immediately moved from its former position into its new one corresponding to the depressed amount key. The setting member 30 is connected by a gear 32 arranged on a shaft 37, with the appertaining type wheel and the indicating wheel, so that these are set according to the amount key depressed.

A detent 33 adapted to be moved upwardly by depressing an amount key 10, is arranged in each amount key bank. An extension of a zero stop pawl 35 rockably mounted upon a fixed stud 36, which normally is in the path of a shoulder 20a of the main differential member 20 holding it in zero position, engages a pin 34 of the detent 33. When the detent 33 is moved upwardly by depressing an amount key, the pin 34 rocks the zero stop pawl 35 into inoperative position, whereby the main differential member 20 is released to be moved in accordance with the value of the key depressed. Teeth 20b of the differential member 20 mesh with a gear 38 mounted upon a shaft 39, with which gear the intermediate pinions 40 allotted to one single row of totalizers each, are in engagement. Thus, all four intermediate pinions 40 of each denominational order, upon setting of the main differential members 20, are set to the value of the depressed keys and rotated backwardly by the same value upon the resetting of the differential members. For amount entering, the selected totalizer is engaged, in a manner to be described hereinafter, with the intermediate pinions 40 before the start of the resetting movement of the differential members 20.

*Totalizer selection*

To select one of the totalizers the following arrangement has been provided. At this point of the description, only the selection of the three rows of special totalizers which are under control of the keys 11, 12, and 13 will be considered.

A differential device similar to the amount differential device consisting of a main differential member 41 and an auxiliary differential member 42 both of which are rotatably arranged on the shaft 22 is allotted (Fig. 4) to each of the three special key banks 11, 12 and 13. A link 43 pivoted to the differential member 41, and a link 44 pivoted to the auxiliary differential member 42 are hinged by a stud mounted at their free ends and provided with a roller 45 guided by a bent over flange 46 of an actuating arm 47 under the action of a spring 48, acting upon the differential device. The actuating arms 47 are loosely mounted upon a shaft 28' the axis of which is the same as the axis of the shaft 28. A bail 55 engages the lower edges of the three actuating arms 47 of the special differential devices. This bail 55 is secured to an arm 56 (Fig. 2), the roller 57 of which is guided by a curved groove 58a of a cam disk 58 performing one revolution at each machine operation. A detent 60 appertaining to each special key bank (Fig. 4) is moved upwardly by pressing a totalizer selecting or special key, and the zero stop pawl 62 is rocked by a pin 61 of the detent 60 out of its operative position. During the following machine operation, the arm 56 (Fig. 2) is rocked clockwise by the curved groove 58a and the bail 55 connected to the arm 56, carries along (Fig. 4) the actuating arms 47. The arched flange 46 forces the roller 45 towards the shaft 22, whereby the two differential members 41 and 42 are rotated in opposite direction, till they embrace the foot of the depressed key from two sides. During this movement, the two differential members 41 and 42 engage the pin 65, lying in their path, of a setting member 66 and move the latter into a position corresponding each time to the key depressed. Each of the setting members 66 meshes with a toothed segment 67 rotatably arranged on the shaft 39, of which segments each one is connected to a second toothed segment 68 (Fig. 9). Each of these toothed segments 68 meshes with a gear 69 connected to a drum 70 secured to a shaft 71 and provided with a curved groove (Figs. 4, 9, 9a, 9b). A roller 72 of a member or socket 73 engages the curved groove of the drum 70. The member 73 itself is prevented from rotating on shaft 74 by its forked arm 73 embracing a rigid pin 76 (Fig. 4). To each of the shafts 74 is secured a totalizer frame 77 supporting a shaft 78 for the adding wheels 80, which are interspersed in each denominational order. The totalizers per se may be of any well known type and form no part of the present invention.

The movements of the setting members 66 are transferred (Fig. 9) by means of the gearing 67, 68, 69 to the appropriate drum 70, which shifts its appertaining shaft 74 and thereby also the totalizer row so far that the adding wheels 80 of the totalizer corresponding to the depressed special key, are positioned in the planes of the intermediate pinions 40 driven by the amount differential devices 20.

When at the end of the machine operation the bail 55 is restored by the cam disk 58, the differential members 41, 42 and the appertaining arms 43 and 44 return to their rest positions under the action of the springs 48.

Totalizer engaging device

In order to engage the totalizer selected with the pinions 40 of the amount differential devices, the following arrangement has been provided:—

Arms 81 (Fig. 9) each provided with a coupling bolt 82, are rotatably arranged on the shafts 74 and shift therewith. The ends of the coupling bolts 82 are mounted in the one side plate 77 of the appertaining totalizer frame. The coupling bolts 82 are also guided in slots 83 of plates 84, carried by the frame of the machine and arranged to rotate about the axes of the shafts 74. The bolts 82, arms 81, and frame 77 participate in the shiftings of the shaft 74 and the appertaining rows of totalizers. The slots 83 are provided with a widened portion into which the portion of larger diameter of the coupling bolt 82 fits.

In the embodiment of the invention shown, by way of example, the three plates 84 of the three rows of special totalizers are connected to each other by means of links 85. It is to be understood, that instead of being linked to one another, each single one could be connected to an actuator. A coupling bar 86 (Fig. 7) is linked to one of these plates 84, a pin 87 of which engages a notch of an engaging disk 90. To the engaging disk 90 a pitman 91 is connected which is moved to and fro at different periods according to the condition of the machine operation each time, by a cam disk 92 actuated by means of the gearing 93—98 (Fig. 8). The engaging disk 90 is rocked first clockwise by the pitman 91 (Figs. 7 and 8) during its movement. When the pin 87 of the coupling bar 86 is in the notch of the engaging disk 90, the three plates 84 connected to each other, are rocked counter-clockwise around their shafts 74. During the axial shifting of the totalizer row the coupling bolts 82 move within the widened portion of the slots 83 of the plates 84. When in the respective totalizer row no totalizer has been selected, i. e., the shaft 74 has been moved into its extreme right hand position (Figs. 9a and 9b the portion of smaller diameter of the coupling bolt 82 is in the slot 83, so that the plate 84 rocks idly around the bolt 82. Consequently, the totalizer row arranged on this shaft 74 is not engaged with the amount differential devices.

When, however, any totalizer of a totalizer row has been selected by means of shifting the corresponding shaft 74 to the left, the portion of larger diameter of the appertaining coupling bolt 82 (Fig. 9) has been brought into the widened portion of the slot 83, fitting tightly into it. When now the plate 84 is rocked by the actuating means above described, the appertaining row of totalizers is carried along and thus the adding wheels 80 of the selected totalizer are engaged with the amount differential devices. Upon the return movement of the engaging disk 90, the adding wheels 80 are disengaged from the amount differential devices.

Changing the engaging times

Since engaging and disengaging for the different modes of operation has to be done at different times, the drive for the cam disk 92 must be varied (Figs. 7 and 8) by machine conditioning means. Connected to the cam disk 92 is a broad pinion 93 meshing with a gear 94 (Fig. 8). A pinion 95 fixed to the gear 94 by a common sleeve 94' surrounding the shaft 95' of the gear 94 can be meshed, by means of a roller 100 fixed to the shaft 95' and guided in a cam groove 99 connected to the mode of operation lever 18, with an actuating gear 96 when setting the lever 18 to "addition", or with a gear 97, when setting the lever 18 to one of its total taking positions, or with a gear 98, when setting the lever 18 to one of its sub-total taking positions. The actuator gears 96, 97, 98 are provided in a well known manner with teeth for intermittent rotation, which teeth are staggered relatively to one another in such a way that the totalizer selected each time, is engaged with the amount differentials for adding operations during the return movement of the amount differentials, for grand total taking during the forward movement, and for sub-total taking during the forward and return movement of the amount differentials.

Totalizer selection for total taking

In order to enable engagement of the totalizer to be zeroized, with the amount differential devices for total taking at the beginning of the machine operation, the totalizer selection for total taking is effected before the start of the machine operation, and that according to the invention is accomplished by means of the total lever 16 (Fig. 2), after the mode of operation lever 18 has been set to the corresponding total taking position. When setting the mode of operation lever 18 (Fig. 3) to total taking, a cam disk 108 connected to it, actuates a roller 109 of a lever 110 and rotates it counter-clockwise. Two arms 111, carrying a bar 112, are connected to the arm 110. Two cylindrical locking members 113 (Fig. 5a) are arranged on the bar 112 between two fixed collars. The locking members 113 upon rocking of the bar 112, are moved into the path of projections 60a of the detents 60 allotted to the banks of totalizer keys 11 to 13.

When the appertaining detent 60 is moved upwardly upon depressing a totalizer or special key, its projection 60a can fill up the free space being present between the locking members 113, and the collars and the members respectively. If a key also of one of the other special key banks would be tried to be depressed the projection 60a would meet the locking member 113, preventing the slide 60 from moving upwardly. Thus, in total taking operations, only one key of the totalizer selecting key banks can be depressed. In order to move the adding wheels of the totalizer selected by the depressed key, into the planes of the amount differential devices, the total taking lever 16 is operated (Fig. 2), a downwardly extending arm of which has mounted thereon a roller 52 engaging a curved slot 51a of an arm 51. The arm 51 is connected by means of a bail 50 to a second bail 49 (see also Fig. 5). The bail 49 extends across the rearward projections 47a (Fig. 4) of the actuating arms 47 serving in a manner already described to drive the differential devices 41, 42 for the selection of the totalizer. Due to the shape of the curve groove 51a, the bail 49 is rocked upon operating the total lever 16 in so far that the three actuating arms 47 are clockwise rotated by the same degree as if each of them would be driven by the cam disk 58. Consequently, the differential members 41 and 42 (Fig. 4) perform a complementary movement. The differential devices of those special key banks in which no key is depressed, are differentiated by the zero stop pawls 62 and position the totalizer rows according to Figs. 9a and 9b, in which the totalizer row due to the position of the coupling bolt 82, is not rocked.

The differential device which is set by the foot of the depressed key, shifts by means of the setting member 66 and the means 67 to 74 (Fig. 9) the totalizer row and therewith the adding wheels of the selected totalizer into the planes of the amount differential devices. Thus the portion of larger diameter of the coupling bolt 82 enters the widened portion of the slot 83 of the plate 84, so that the selected totalizer, when the cam disk 92 is rotated at the very start of the machine operation, is at once engaged with the amount differentials.

*Machine release for total taking operations*

As can be seen from Fig. 2, a lateral extension of the total lever 16 carries a pin 115 which engages a longitudinal slot 116 of a link 117. The link 117 is linked to an arm 118 secured to the shaft 119. When the total lever 16 upon its counter-clockwise movement has actuated the differential devices of all three rows of totalizer keys, the pin 115 meets the lower edge of the slot 116 during the succeeding rotation, carries along the link 117 and rocks the shaft 119 counter-clockwise, whereby the machine is released in a well known manner (not shown) and the circuit for the motor drive is closed respectively.

When setting the mode of operation lever 18 (Fig. 7) to sub-total or total taking from the main or the special totalizers, a gear 215, which is connected by means of a sleeve 216 to a cam disk 120 (Fig. 6), is rotated by means of a segment 18a integral with the lever 18. The one arm of a bell crank lever 121 cooperates with the cam disk 120. A locking slide 122, the radial slot 123 of which is normally beneath the pin 124 of the motor bar 15, is linked to the free arm of the bell crank lever 121, so that depressing the motor key 15 is not prevented.

When setting the mode of operation lever 18 to the said positions, the bell crank lever 121 is counter-clockwise rocked by the cam disk 120, and the slide 122 is forced downwardly so that a solid portion of the slide 122 is moved beneath the pin 124 and locks the key 15 against depressing.

At the end of each machine operation two restoring levers 221 and 222 (Figs. 2 and 3) loosely mounted upon the shaft 28' are rocked in counter-clockwise direction by a lever 223 and a double cam disk 224, 225 each, acting upon rollers of said levers, so that the working surfaces 221a, 222a, 222b engage a roller 226 and 227, respectively, of the total lever 16 and the mode of operation lever 18 and thereby restore both said levers 16 and 18 from any set position into the "add" position. Upon restoration of the levers 16 and 18 also the bails 49 and 213 are moved into their normal positions, so that the springs 48 are enabled to restore the differential members 41, 42 and 41', 42'. Near the end of the machine operation the restoring levers 221 and 222 are rocked clockwise into their rest position.

*Total taking device*

The main differential member 20 of an amount differential device (Fig. 13), as already specified, is arrested in zero position by the zero stop pawl 35, when no amount key is depressed, and is released for an adding operation by depressing an amount key, whereby the zero stop pawl is brought into ineffective position. When taking totals, the zero stop pawls 35 are disengaged in a well known, but not shown, manner upon setting the mode of operation lever 18 to total taking positions. The auxiliary differential member 21 is not locked with the mode of operation lever 18 set to addition. It is locked, however, for a total taking operation by a roller 125 moved into the path of a radial edge 21b of the auxiliary differential member 21.

The roller 125 is arranged on a link 126 which is guided by a pin 125a in a slot 134 of a partition wall, and is linked with its other end to a pin 127 of a bell crank lever 128. The lever 128 is rockably, but not shiftably arranged upon a shaft 129 and bears, under the action of a spring 130, by a roller 131 upon the rim of a cam disk 132. This cam disk 132 is secured to a shaft 133, which is rocked by the mode of operation lever 18, and is shaped in such a way that the bell crank lever 128 with the mode of operation lever set to "adding", is positioned by the link 126 as shown in Fig. 13, where the roller 125 is out of the path of the auxiliary differential member 21.

However, when the mode of operation lever 18 is moved into one of the total taking positions, the means 125 to 133 are positioned as shown in Fig. 14, in which the roller 125 due to the action of the slot 134 is in front of the radial edge 21b of the auxiliary differential member 21, and the centres of the shaft 129 as well as of the roller 125 and the pin 127 are lying in a straight line. When now the amount differentials are actuated by means of the arms 27, first of all only the main differential members 20 are moved, since the auxiliary differential members 21 are locked in their zero position by the roller 125, and return counter-clockwise the adding wheels 89 of the selected totalizer into zero position, where they are arrested by their zero teeth striking locking pawls 137 (Fig.

15). Shortly before reaching the zero position, when an adding wheel is passing from "1" to "0", a zero tooth 138 of the respective adding wheel lying in another plane, strikes an arm 139a of a reversing lever 139 rotatably mounted upon the shaft 39. One arm 139a each, is allotted to each row of totalizers. During adding actions the arms 139a are out of the path of the zero teeth 138, but are moved into the path of the zero tooth proper for total taking. A forked arm 139b of the lever 139 embraces a roller 140 of the bell crank lever 128 and, consequently, is capable of being shifted also by the mode of operation lever 18. Thus, when an adding wheel passes from "1" to "0", its zero or tens carrying tooth 138 meets the appertaining arm 139a and moves the lever 139 clockwisely from the position shown in Fig. 14 to the one shown in Fig. 15 in dashed-dotted lines. Thereby the toggle joint formed by one arm of the lever 128 and the link 126 and being normally stretched, is bent slightly against the action of the spring 130, whereby the roller 125 is removed from the path of the radial edge 21b and moved into the path of a bevel edge 21c of the auxiliary differential member 21, which during its clockwise movement bends it fully, as will be seen from the following description.

A pin 142 secured to the bell crank lever 128 is embraced by a forked arm 143 mounted upon the shaft 129, which arm is connected to a locking arm 144. When the lever 128 is rocked counter-clockwise by means of the lever 139, the locking arm 144 partakes in this rotation. This movement of the arm 144 engages the pin 145 with a radial slot of the main differential member 20 in the path of the pin 145, and locks the main differential member 20 against any further movement. The pin 145 first takes the position shown in dashed-dotted lines in Fig. 15. In this manner the main differential member 20, upon an adding wheel passing from "1" to "0" is locked during total taking operations in a position corresponding to the value taken from the respective adding wheel. As the arm 27 continues its clockwise rotation, the further actuating movement is transmitted to the auxiliary differential member 21. Thus, the latter is counter-clockwisely rotated, whereby the bevel edge 21c actuates the roller 125 and continues rotating lever 128 as well as the arms 143 and 144 counter-clockwisely, against the action of the spring 130, till the pin 145 takes the position shown in full lines in Fig. 15. During the further counter-clockwise rotation of the auxiliary differential member 21, the members are arrested in this position by means of the curved edge on which the roller 125 is gliding. The actuating movement of the arm 27 is absorbed when the auxiliary differential member has been moved so far against the main differential member that the stud 31 of the setting member 30 is gripped by both differential members. During this movement the setting member 30, thus, differentiates the printing wheels 301 and the indicating device 310 of the respective denominational order to the value taken from the adding wheel. After both differential members have reached this position, there is a short interruption during which both stand still.

When, thereupon, the arm 27 returns to its normal position, the auxiliary differential member 21 is clockwisely restored, as the main member 20 is locked, till the curved edge of the auxiliary differential member has been removed from beneath the roller 125. Now the lever 128 and the arms 143 and 144 can be clockwisely rocked by the tensioned spring 130. In the case of a total taking operation, the totalizer has been disengaged already after the first movement of the differential members is ended and they are stationary during the interruption. Consequently, the tensioned spring 130, after the return of the auxiliary differential member 21, restores the arms 143 and 144 to normal position as well as the lever 128 to the position to be seen in Fig. 14. Thus, the differential member 20 is also released and can be restored to rest position by the arm 27 during the remainder of its counter-clockwise rotation.

For a sub-total taking operation the total taken has to be re-transferred during the differential movement of the auxiliary members to the zeroized totalizer. Thus, the adding wheels remain engaged with the intermediate wheels 40 up to the end of the movement of the differential members. When in this case the auxiliary differential member 21 has reached again its normal position, the tensioned spring 130 clockwisely rocks the arms 143 and 144 as well as the lever 128 only so far, till the projection 139a of the lever 139 meets the tens tooth 138 of the engaged adding wheel (position in dashed-dotted lines in Fig. 15). At this moment, the pin 145 is positioned as shown in dashed-dotted lines in Fig. 15. The radial slots 20' of the differential member 20 are bevelled at their right hand edges, so that a small counter-clockwise rotation of the differential member 20 is possible in said position of the pin 145. Upon this counter-clockwise rotation of the differential member 20, the adding wheel is clockwisely rotated by a corresponding degree, and the tens tooth 138 is removed from the appertaining projection 139a. Now the members 139, 128, 143 and 144 can return again, under the action of the spring 130, into their positions according to Fig. 14, whereat the pin 145 is finally removed from the slot of the differential member 20. Thereupon nothing prevents a further counter-clockwise rotation of the differential member 20.

When the mode of operation lever 18 is returned to adding position, the cam disk 132 restores the bell crank lever 128 and the members connected therewith, into the position as per Fig. 13, in which the auxiliary differential member 21 is released. Thereat the locking arm 144 is likewise counter-clockwisely rotated; however, the arm 144 can not lock the main differential member 20, since the shaft 129, upon which it is rotatably, but not shiftably, mounted, is shifted to the left (Fig. 16) by means of a curved-groove drum 148 engaged by a roller 147 secured to the shaft 129, as soon as the mode of operation lever is set to "adding". Thereat the pin 145 of the locking arm 144 is removed out of the plane of the main differential member 20.

*Main and itemizing totalizer*

In the machine shown by way of example a main totalizer and an itemizing totalizer for itemizing multiple items is provided in addition to the three rows of special or transaction totalizers. The adding wheels 150 and 151 of these two totalizers are mounted upon a common shaft 78' (Figs. 10 and 11), which is supported by a totalizer frame 77' secured to a shaft 74'. The shaft 74' can be laterally shifted in the same manner, as it has already been described for the shafts 74 of the three other rows of totalizers, to select the one or the other totalizer, and be rocked at the given times corresponding to the mode of operation to engage the selected totalizers with the amount differential devices. Each of the adding wheels 150 of the main totalizer (Fig. 11) is connected by means of a sleeve to a one-toothed tens transfer wheel 152. On the said sleeve is arranged a second sleeve carrying at one end an adding wheel 151 of the itemizing totalizer and at the other end the appertaining tens transfer wheel 153. A gear 154 is rotatably arranged between those two wheels, which gear, upon engagement of this row of totalizers, comes into mesh with the intermediate coupling pinion 40 of the appertaining amount differential device, when the totalizer row to engage the main totalizer has been shifted to the right. This shifting is effected by means of the motor key bank (Fig. 6), in which bank the itemizing key 14 is arranged. When the key 14 is depressed, the zero stop pawl 161 is rocked by means of a slide or detent 160 into inoperative position, so that the differential members 41' and 42' of the proper special differential device are differentiated by the foot of the key 14. Thereat the shaft 74' is shifted to the left (Fig. 11) by the setting member 66' and the members 67' to 73', so that the adding wheels 151 of the itemizing totalizer face the intermediate wheels 40, and the tens transfer wheels 153 proper face the tens carrying pinions 155 (Fig. 12). Said tens carrying device does not form any part of the invention and thus is not specified in detail.

However, when the itemizing key 14 is not depressed, the zero stop pawl 161 (Fig. 6) remains in its operative position and differentiates the differential device 41', 42', which shifts the totalizer row by the means 66' to 74' to the right, whereupon the wheels 154 face the intermediate wheels 40 of the amount differential devices, and the tens transfer wheels 152 of the main totalizer are opposite the tens carrying pinions 155.

When for an itemizing operation various items have been entered into the itemizing totalizer, the itemized total added thereon has to be transferred to the main totalizer. This is done in the following manner:—

The gear 154 and the adding wheel 150 of the main totalizer, are coupled by means of two gears 165 connected to one another. The coupling gears 165 are supported by two arms 166 (Figs. 10 and 11) rotatably mounted upon the shaft 74'. An arm 167 is arranged on the shaft 74' between every two arms 166, which arm 167 carries a coupling pinion 168. One link each 169 or 170, respectively, acts upon the backward projections of the arms 166 and 167. All links 169 and 170 are rotatably arranged upon a rod 171, forming thus a toggle joint, the two ends of which rod 171 are engaged by one bar 172 each. Each bar 172 is linked at its other end to a lever 173 (Fig. 10) arranged rotatably upon a pivot 174, and engages by its pin 175 an angular slot 176 of a slide 177. The slide 177 embraces by its one forked end the shaft 39 and is actuated by its roller 178 guided in a curved groove 179a of a cam disk 179 secured to a shaft 184, which disk performs a clockwise rotation at each machine operation. A pitman 181 guided on the shaft 22 and engaging by its roller 182, under the action of a spring 185, the rim of a cam disk 183 connected to the mode of operation lever 18, is pivoted by a pin 180 to the slide 177.

When the mode of operation lever 18 is set to "adding", the cam disk 183 and the slide 177 are positioned as shown in Fig. 10, and the pin 175 of the lever 173 is in the upper part of the angular slot 176.

In the rest position the slide 177 keeps by means of the members 175, 173, 172, 171, 170, 169, 167, 166 the gears 165 in engagement with the toothed wheels 154 and the adding wheels 150 of the main totalizer, and the coupling pinions 168 are in disengaged position and held locked by the locking bar 186 secured to the totalizer frame 77'. At the beginning of the machine operation, the lever 173 is first clockwisely rocked by the cam disk 179 acting upon the slide 177, whereby the arms 166 and 167 are rocked by the members 172, 171, 170 and 169 in opposite directions. Due to this, the coupling pinions 168 are engaged with the toothed wheels 154 and the adding wheels 151 of the itemizing totalizer, whereas the coupling gears 165 are disengaged and then engaged with the locking bar 186. After a rotation by about 180 degrees of the disk 179 the coupling gears 165 and the coupling pinions 168 are restored by means of the curved groove 179a to normal position, in which the coupling gears 165 connect the toothed wheels 154 to the adding wheels 150 of the main totalizer. Stop pins 188 and 189 are mounted on the totalizer frame 77' to limit these coupling movements.

This totalizer row is engaged with the amount differentials in a similar manner as the other totalizer row. An arm 81' carrying a coupling stud 82' (Figs. 7 and 11) is secured to the shaft 74', and is adapted to be set in a manner already described by the special differential device of the motor key bank (Fig. 6). The stud 82' is guided in a bore of an arm 84' rotatably mounted upon a hollow stud carried by the framework of the machine. The hollow stud surrounds the shaft 74' so that the arm 84' pivots on an axis coincident with the axis of the shaft 74'. To the arm 84' is linked a link 86', the roller 88' of which is guided (Figs. 7 and 8) in the curved groove 190a of a disk 190 and the pin 87' of which link is arranged to enter a notch of the engaging disk 90. The disk 190 is connected by gearing 191, 192 with the mode of operation lever 18, and its curved groove 190a is shaped in such a way that the pins 87 and 87' of the coupling links 86 and 86', when the mode of operation lever is set to "adding", are forced to engage the notches of the engaging disk 90. The engaging disk 90, as already described, is at certain times corresponding to the mode of operation set up, rocked to and fro, first clockwisely and then back again by a certain angle, whereby the selected totalizer rows are engaged with and disengaged from the amount differential devices by the coupling links 86, 86'.

Upon setting the mode of operation lever 18 to X or Z (reading or resetting the special totalizers) only the pin 87 of the coupling link 86 is engaging, by the curved groove 190a, a notch of the engaging disk 90; upon setting the mode of operation lever to GX or GZ (reading or resetting the main totalizer) only the pin 87' is engaging a notch of the engaging disk, so that by operating the mode of operation lever 18 always the corresponding totalizer row or rows are connected to the engaging device and, simultaneously, the engaging times corresponding to the mode of operation are determined by means of the shifting cam 99. The pin 87 or 87' respectively, not entering a notch of the engaging disk 90 is moved, by means of the curved groove 190a, into the notch of a stationary segment 193, and arrested there.

Upon setting the mode of operation lever 18 to item total "T", the pin 87' is moved by means of the curved groove 190a into the notch of the engaging disk 90. Simultaneously, those actuating members for the engaging disk 90 are selected by means of the shifting cam 99 which are allotted to the mode of operation "Reading". Furthermore, upon setting the mode of operation lever 18, a pitman 196 (Fig. 3) rotating clockwisely an arm 197 and a shaft 198, is lifted up by its roller 195 acted upon by the cam disk 198 (Fig. 3). Further, an arm 199 is secured to the shaft 198 (Figs. 2 and 5), which arm can cooperate with a pin of a slide 200 under the action of a spring 201. When the shaft 198 is clockwisely rocked upon setting the mode of operation lever 18, the arm 199 moves the slide 200 to the left, against the action of the spring 201. Thereat the frontal edge of the slide 200 strikes a pin 202 of a lever 203 and rocks it clockwisely. A locking slide 204 is linked to the upper arm of the lever 203, the locking nose of which slide catches, under the action of a spring 206, the pin 205 of the shaft of the itemizing key 14, when this key is depressed for an itemizing operation. When the mode of operation lever 18 is set to the position "T" for taking an item total, and thereat the lever 203 is clockwisely rotated in the described manner, the locking slide 204 is brought against the action of the spring 206 into ineffective position, in which its nose releases the pin 205 of the itemizing key 14, so that this key, under the action of its spring (not shown), returns into its rest position.

An extension of the mode of operation lever 18 carries a roller 210 (Figs. 3 and 5) engaging a curved slot 211 of an arm 212 secured to the shaft 28'. Further, upon the shaft 28', a lever 213 is mounted a bent over portion of which is acting upon the rear extension of an actuating arm 47'. The curved groove is shaped in such a way that the arm 212 is clockwisely rocked, when setting the mode of operation lever 18 from "Add" to "T" or any total taking position. Thereby the lever 213 (Fig. 3) connected to the arm 212, carries along the actuating arm 47', which arm differentiates in the same manner as the actuating arms 47 the differential members 41', 42' (Fig. 6) of the special differential device allotted to the motor key bank.

For adding operations, the differential members 41', 42' are differentiated not by the mode of operation lever 18, but jointly with the other differential members 41, 42 of the other special differential devices by the cam disk 53 (Fig. 2) and the arm 56 and the bail 55.

*Machine operation*

The machine operates for the various modes as follows:—

(1) To register, add and print a single amount the mode of operation lever 18 is set to "Add" (Fig. 1). Thereupon with the locking members 113 of the shaft 112 (Figs. 3 and 5a) positioned out of the path of the projections 60a of the key detents 60, one key can be depressed in each special key bank 11, 12 and 13. The machine is released by depressing the motor key 15 being free of the locking slide 122 (Fig. 6). At the start of the machine operation, effected by rotating the main shaft 22, the curved groove 58a of the cam disk 58 mounted upon the main shaft 22 rocks by the arm 56 and the bail 55 the actuating arms 47 and 47' (Figs. 2 to 5) first clockwisely, whereby the differential members 41, 42 and 41', 42' of the differential devices allotted to the four rows of special keys are rocked and arrested by the foot of the key depressed in any bank, or the zero stop pawl when no key in the respective bank is depressed. The differential members differentiate by acting upon the stud 65 or 65' respectively, the appertaining setting member 66 or 66' respectively and thus the type wheels 301 and the indicator wheels 310 accordingly for identifying the special keys depressed. Thereby the totalizer row appertaining to the key depressed as well as the other rows as pointed out later on, is laterally shifted (Fig. 9) by the means 67 to 74, so that the adding wheels 80 of the selected totalizer face the intermediate pinions 40 of the amount differential devices.

As the itemizing key 14 is not depressed, the appertaining totalizer row is set by the zero stop pawl 161 so that the gears 154 face the intermediate pinion 40 (Fig. 17a) and the main totalizer is engaged as well.

Simultaneously with the actuating arms 47 also the actuating arms 27 mounted upon the shaft 28 (Fig. 13) are clockwisely rocked, which arms actuate the main and the auxiliary differential members 20 and 21 of each amount differential device to be arrested by the foot of the depressed amount key 10.

With the mode of operation lever positioned to "Add" the cam disk 190 (Figs. 7 and 8) moves by the gears 191, 192, and the pins 87 and 87' into a notch of the coupling disk 90. Moreover, by the shifting cam 99 (Figs. 7 and 8) the pinion 95 is engaged with the actuating disk 96, the teeth of which impart a quarter revolution to the pinion 95 after the amount differentials have been differentiated and restored. In consequence of the first rotation of the pinion 95, the cam disk 92 is rotated by 180 degrees, and the engaging disk 90 is clockwisely rocked by the pitman 91. Consequently, the plates 84 and 84' of all totalizer rows are counter-clockwisely rocked by their links 86 and 86'. Thereat those totalizer rows are carried along into the recesses 83 of the plates 84 (Fig. 9) of which the portion of their bolts 82 fits. As the coupling bolt 82' is not provided with a portion of smaller diameter (Fig. 11), the totalizer row containing the main totalizer and the itemizer is always engaged, when the plate 84' is rocked. If a special key in each bank 11, 12 and 13 is depressed, the three totalizer rows are rocked, and the adding wheels of the thus selected totalizers are engaged with the intermediate pinions 40 of the amount differential devices. Upon the engaging movement of the uppermost totalizer row, the gears 154 mesh with the appertaining intermediate pinions 40 (Fig. 11). The coupling pinions 168 connecting (Fig. 17a) the gears 154 with the adding wheels 151 of the itemizer, are rocked to their inoperative position by the disk 179 (Fig. 10) and the means 177, 173, 172, 170, 169, whereas the coupling gears 165 are meshed with the gears 154 and the adding wheels 150 of the main totalizer (Fig. 17b).

With the totalizers engaged, the amount differentials 20 and 21 are restored to their rest position during the return movement of the actuating levers 27, whereat the amount set up each time is entered by the intermediate pinions 30 and 40 into the engaged adding wheels 80 of the three selected totalizers and wheels 150 of the main totalizer respectively.

After entering the amount, the tens carrying is effected in a well known manner, not shown, whereupon the totalizers are disengaged again (Figs. 7, 8, 9) by the means 84 to 81 during the second partial rotation of the pinion 95.

(2) To register and record multiple items, besides amount keys 10, also one of the special keys 11, 12, 13 and the itemizing key 14 are to be depressed with the mode of operation lever 18 in the add position.

Upon depressing the motor key 15 for starting the machine operation the machine operates in just the same manner as if a single amount is registered with the exception regarding the upper row of totalizers. With the itemizing key 14 depressed, the zero stop pawl 161 has been disengaged (Fig. 6) by the slide 160, so that the differential members 41', 42' are differentiated by the foot of the key 14 and at the same time the uppermost totalizer row is shifted to the left by the differential setting member 86' and the means 67' to 74' (Fig. 11) connected therewith. Thus, the adding wheels 151 of the itemizing totalizer face the pinions 40 (Fig. 17c). When during the machine operation the coupling gears 165 are engaged with the gears 154 and the adding wheels 150 of the main totalizer, this is of no effect whatever as only the adding wheels 151 of the itemizer mesh directly (Fig. 17d) with the pinions 40 of the amount differentials, and are advanced according to the item at the time set up upon restoring the amount differential members. Simultaneously, the item set up, is entered into the selected totalizers of the other totalizer rows, which thereupon are disengaged again.

(3) After registering and recording all the multiple items of a single sale, the multiple item total contained in the itemizer, is to be taken. To that effect the mode of operation lever 18 is set to "T" position. First of all, thereby the detent 204 (Fig. 2), which held the key 14 depressed during the entering of the multiple items, is moved to the right by the cam disk 108 and the members 195 to 203 (Fig. 3) for releasing the key 14. Then the differential members 41', 42' are differentiated by the roller 210 of the mode of operation lever 18 and the arms 212, 213 and 47' connected therewith as well as by the zero stop pawl 161, the latter being in its operative position, whereby the upper totalizer row is again shifted to the right (Fig. 11). With the setting of the mode of operation lever 18 to "T", the shifting cam 99 shifts the pinion 95 into the plane of the actuating disk 97 which is appropriate to the reading action, and engages the totalizers at the beginning of the machine operation, and disengages same only after restoring the amount differential members to rest position. Further, the mode of operation lever 18 rotates by the gears 191 and 192 the cam disk 190 (Figs. 7 and 8), the curved groove 190a of which disengages the coupling bar 86 from the engaging disk 90, which is thus coupled with the coupling bar 86' only. When at the beginning of the machine operation the engaging disk 90 is clockwisely rotated, only the uppermost totalizer row is engaged, the wheels 154 of which mesh with the pinions 40 and thereat first with the coupling pinions 168 and the adding wheels 151 of the itemizer (Fig. 17e).

As for all total taking operations by setting the mode of operation lever 18 to "T" the shaft 133 (Figs. 13 and 14), the cam disk 132 and the curve-groove drum 148 (Fig. 16) have been rotated clockwisely, consequently, the lever 128 is rocked clockwisely by the cam disk 132 and moves the roller 125 in front of the radial edge 21b of the auxiliary differential member 21 in order to lock it. Together with the lever 128 also the locking arm 144 is clockwisely rocked and is simultaneously shifted to the right (Fig. 16) by the curve-groove drum 148 so that its pin 145 comes into the plane of the main differential member 20, but first still out of the path of the main differential member 20 (Fig. 14).

When the differential device is actuated by the arms 27 rocking, the auxiliary differential members 21 remain locked and only the main differential members 20 are moved. They counter-clockwisely rotate by the pinions 38 and 40 the adding wheels 151 of the itemizing totalizer till, during passing from "1" to "0", the zero tooth 138 rocks the lever 139 clockwisely, and by the forked arm 139b of the latter the lever 128 counter-clockwisely, so that the roller 125 faces the bevel edge 21c of the auxiliary differential member 21. Upon its counter-clockwise movement the lever 128 takes along the arm 144 engaging by its pin 145 the opposite radial slot of the main differential member 20 and preventing it from further clockwise rotation. Due to the locking of the main differential member 20, the auxiliary differential member 21 is counter-clockwisely rotated during the remainder of the clockwise rotation of the actuating arm 27. Thus the itemizer becomes zeroized, whereas the amount differential devices are set to the total taken from the itemizing totalizer.

As the engaging and disengaging times for "Reading" are applied to taking multiple item totals, the uppermost totalizer row is not disengaged between differentiating and restoring the amount differential members. However, before the start of the restoration of the differential members, during the interval of standing still the coupling pinions 168 and 165 are shifted so far that the gears 154 are coupled (Fig. 17f) with the adding wheels 150 of the main totalizer by the coupling pinions 165. In restoring the amount differential members, first the auxiliary differential member 21 is moved to zero position. Thereafter, the lever 128 and the locking arm 144 are rocked clockwise (Figs. 14 and 15) by means of the spring 130. Now the main differential member 20 can rotate somewhat counter-clockwisely, whereby the tens tooth 138 is removed from the appertaining arm 139a. Now the pin 145 of the locking arm 144 is entirely disengaged from the main differential member 20 so that it can counter-clockwisely return to its normal position. Thereat the main differential members transmit the multiple item total to the main totalizer now engaged, which is disengaged at the end of the machine operation together with the disengaging of the uppermost totalizer row.

(4) For subtotal or total taking from the main totalizer, the mode of operation lever 18 is set to "GX" or to "GZ" respectively, and thereby the pinion 95 is confronted with either the actuating disk 96 or 97 (Figs. 7 and 8) which actuate the engaging disk 90 at the times corresponding to the mode of operation "Reading" or "Zeroizing" i. e. "Resetting". Thereat the mode of operation lever 18 differentiates also the cam disk 190 so that only the coupling bar 86' of the uppermost totalizer row remains connected to the engaging disk 90, and the other totalizer rows are disengaged.

Moreover, upon setting the mode of operation lever 18, also the differential members 41', 42' are actuated by the pin 210 and the arms 212 and 213 (Figs. 3 and 5), and differentiated as the itemizing key 14 is not depressed, by the zero stop pawl 161 (Fig. 6). Consequently, the uppermost totalizer row is shifted to the right, till the gears 154 face the pinion 40 of the amount differential devices (Fig. 17m). In the rest position of the machine, the gears 154 are coupled by means of the coupling pinions 165 with the adding wheels 150 of the main totalizer due to the cam disk 179. Whereas for all other actions immediately at the beginning of the machine operation the coupling pinions 165 and 168 are shifted to engage the gears 154 with the adding wheels 151 of the itemizing totalizer, for total taking from the main totalizer, its adding wheels 150 have to remain in engagement with the differential wheels 154 and the amount differential device (Figs. 17i, 17k). This is obtained in the following way:—

Upon setting the mode of operation lever 18 to "GX" or "GZ" the cam disk 183 (Fig. 10) is rocked and by the pitman 181 the slide 177 is raised, whereby the horizontal portion of the angular slot 176 is moved into the path of the pin 175 of the lever 173. Further, the cam disk 120 (Fig. 6) when rocked by the lever 18 in total positions moves a solid portion of the locking slide 122 beneath the pin 124 of the motor key, thereby preventing its depression, and therefore the machine can only be released by setting the total lever 16 (Fig. 2) to total taking, in which position the pin 115 of the lever 16 strikes the lower border of the slot 116 and rocks the shaft 119 by the link 117 and the arm 118. But, before the pin 115 becomes operative, the pin 52 of the lever 16 actuates by the arm 51 and the bail 49 (Figs. 2 and 4) the actuating arms 47 to actuate the differential members 41, 42 of the three special differential devices differentiated by the zero stop pawls 62, as no keys are depressed in the appertaining three special rows 11, 12, 13.

During the machine operation released by the total lever 16, the cam disk 179 moves the slide 177 at once to the left. This movement otherwise effecting the re-engagement of the coupling pinions 165 and 168, has now no effect, as the lower horizontal portion of the angular slot 176 of the slide 177 when rocked, glides on the pin 175 of the lever 173 (Fig. 10). A pin 218 of the slide 177 contacting from beneath a projection 219 of the lever 173, prevents the lever 173 from clockwisely rocking during this machine operation. Thus, the coupling pinions 165 are meshing with the gears 154 and the adding wheels 150 of the main totalizer (Figs. 17g, 17h, 17i, 17k) and a total or a sub-total is taken therefrom according to the period of the engagement, whether that is during the setting of the amount differential members only or during the setting and resetting.

(5) For sub-total or total taking from one of the special totalizers, the mode of operation lever 18 is set accordingly to "X" or "Z", whereby the actuating means corresponding to the mode of operation are selected, the motor key 15 is locked, and the amount differential devices are shifted to total taking. The cam disk 168 (Fig. 3) moves the locking member 113 into the path of the projections 60a of the key detent 60, so that only one key of one of the special key banks 11, 12 or 13 can be depressed. Upon setting the mode of operation lever 18 to total taking, it actuates the differential members 41', 42' of the motor key bank by the means 210, 212, 213 (Figs. 3, 5, 6), which as the itemizing key 14 is not depressed, are differentiated by the zero stop pawl 161, thus shifting the uppermost totalizer row to the right. At this machine operation, the engagement of the itemizing or the main totalizer of this row is prevented (Figs. 17m and 17n) thereby that the cam disk 190 acted upon by the mode of operation lever 18 disengages the bar 86' from the engaging disk 90 (Fig. 7) which thus is engaged by the bar 86 only. By the engaging disk 90, the plates 84 of all three totalizer rows are rocked, but only that totalizer row is actuated, in which a totalizer is selected by the depressed special key and the coupling bolt 82 of that row fits by its portion of larger diameter the recess 83 of the plate 84. From the totalizer selected and engaged in that manner, now, according to the position of the mode of operation lever 18, either a sub-total or a total is taken.

In the modified form shown in Fig. 5b the total lever 16 is done away with. The release function of the total lever 16 for total taking operation is effected by the motor key 15. That necessitates extending of the bail 55 till the motor and itemizing key bank 14 as shown in Fig. 5b. Thus also the detent 122 and the parts connected therewith as shown in Fig. 6 are to be omitted as well as the whole mechanism illustrated in Fig. 2.

While the form of mechanism herein shown and described, is admirably adapted to fulfill the objects primarily stated, it is to be understood that it is not intended to confine the invention to the embodiments herein disclosed, for it is susceptible of embodiment in various other forms all coming within the scope of the claims which follow.

What is claimed as new is:

1. In a cash register, accounting and the like machine provided with several rows of totalizers, a differential device consisting of two complementarily rocked differential members and a setting member differentiated by them, a machine conditioning means adapted to actuate and set directly the differential device for totalizer selecting before the start of a total taking machine operation.

2. In a cash register, accounting and the like machine, a totalizer row containing a main totalizer and an itemizing totalizer, tens carrying teeth in said totalizers, a special key bank allotted to the totalizer row and containing an itemizing key, a differential device for said special key bank consisting of two differential members and a setting member, a toggle joint connecting both said differential members to rock them simultaneously and complementarily to and from a set position when acted upon during the machine operation in adding actions and separately in item total machine operation, machine conditioning means adapted to control the machine operation in multiple item total actions to transfer said total to the main totalizer by a sub-total action in one single machine operation by actuating directly the differential device to select the itemizer for resetting, locking means cooperating with the conditioning means and actuated by the tens carrying teeth of the itemizing totalizer when reset to first lock the auxiliary and afterwards the main differential member, and coupling means for said totalizers adapted to change the engagement of the itemizing totalizer to engagement of the main totalizer before separate restoration of the differential members.

3. In a machine of the class described, the combination of two totalizers and a mechanism to transfer a total from one totalizer to the other totalizer, said mechanism including a differential means movable from a normal position and return, a pinion common to both totalizers, means to engage and disengage the pinion with the differential means, a plurality of coupling means, one to couple the pinion to one totalizer during the initial movement of the differential means and the other to couple the other totalizer with the pinion during the return movement of the differential, and means to alternately move the coupling means into coupling position.

4. In a machine of the class described, the combination of two totalizers and a mechanism to transfer a total from one totalizer to the other totalizer, said mechanism including a differential means movable from a normal position and return, a pinion common to both totalizers, said pinion mounted coaxially with the totalizers, a rocking frame to support the totalizers and the pinion, means to rock the frame to engage the pinion with the differential means, a plurality of coupling means, one for each totalizer, whereby the totalizers are alternately engaged with the pinion to first transfer a total from one totalizer to the differential means and then transfer the total from the differential means to the other totalizer, a separate frame to support each coupling means, a toggle joint between the frames, and means connected to the toggle joint to operate said supports to alternately engage said coupling means.

5. In a machine of the class described, the combination of two totalizers and a mechanism to transfer a total from one totalizer to the other totalizer, said mechanism including a differential means movable from a normal position and return, a pinion common to both totalizers, said pinion mounted coaxially with the totalizers, a rocking frame to support the totalizers and the pinion, means to rock the frame to engage the pinion with the differential means, a plurality of coupling means, one for each totalizer, whereby the totalizers are alternately engaged with the pinion to first transfer a total from one totalizer to the differential means and then transfer the total from the differential means to the other totalizer, a separate frame to support each coupling means, a toggle joint between the frames, means connected to the toggle joint to operate said supports to alternately engage said coupling means, and means on the main drive shaft to actuate the connections.

6. In a machine of the class described, the combination of two totalizers and a mechanism to transfer a total from one totalizer to the other totalizer, said mechanism including a differential means movable from a normal position and return, a pinion common to both totalizers, means to engage the pinion with the differential means prior to the initial movement of the differential means and to disengage the pinion from the differential means after the differential completes its return movement, a coupling means to couple one totalizer with the pinion during the initial movement of the differential means to transfer the total from the totalizer to the differential means, another coupling means to couple the other totalizer with the pinion during the return movement of the differential means to transfer the total from the differential means to said other totalizer, and a common means to actuate both coupling means.

ERNST BREITLING.
JULIUS PATZELT.